April 5, 1955  W. E. ZIERER  2,705,540
MOTOR VEHICLE CARBURETOR AIR SUPPLY STRUCTURE
Filed Dec. 16, 1949  2 Sheets-Sheet 1
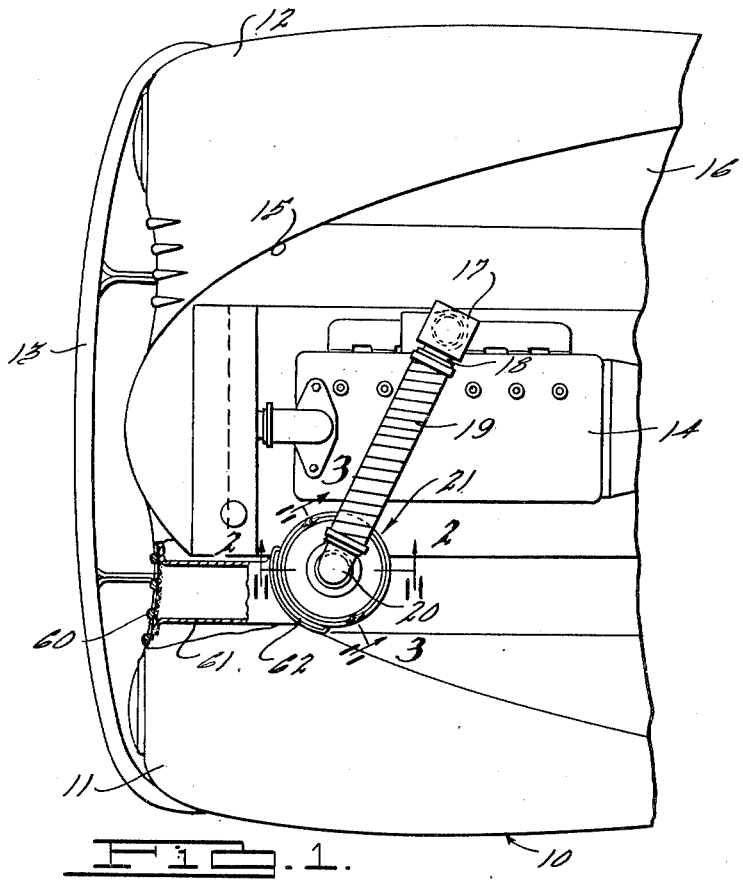
INVENTOR.
Wallace E. Zierer
BY Harness and Harris
ATTORNEYS

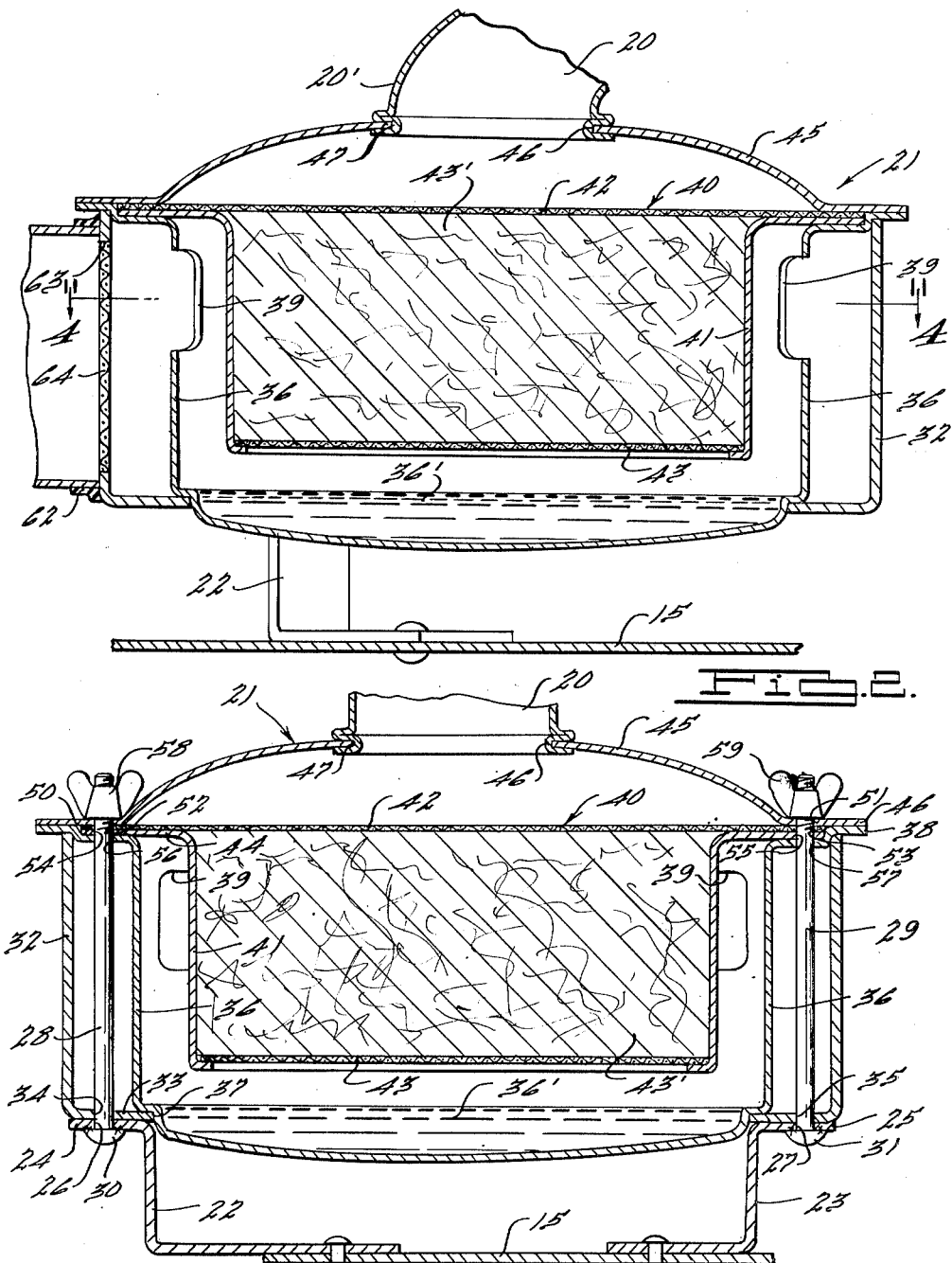

United States Patent Office 2,705,540
Patented Apr. 5, 1955

2,705,540

MOTOR VEHICLE CARBURETOR AIR SUPPLY STRUCTURE

Wallace E. Zierer, Franklin, Mich., assignor to Chrysler Corporation, Highland Park, Mich., a corporation of Delaware Application December 16, 1949, Serial No. 133,421

1 Claim. (Cl. 180—54)

My invention relates to a vehicle internal combustion engine and particularly to novel structure for delivering air to the carburetor of the engine.

In the past, motor vehicle engine carburetors have been supplied with air taken from under the hood of the vehicle. This air is heated by the engine prior to admission to the carburetor and is accordingly less dense than the cooler outside air. It has been proposed to supply a conventional engine with an air intake structure which in one position receives air from outside the vehicle and delivers it to the carburetor and in an alternate position receives air in the conventional manner from within the engine compartment for delivery to the carburetor. A principal object of my invention is to provide an internal combustion engine with improved air intake structure for selectively delivering warm and cold air to the carburetor of the engine.

Another object of my invention is to provide a vehicle with an improved air intake structure which delivers forced air to the engine.

A further object of my invention is to provide a novel air intake and cleaning structure for a vehicle engine which may be conveniently added to conventional engines.

Another object of the invention is to so combine a filter unit in an engine carburetor air supply system that both the inside and outside air is cleaned before it is supplied to the carburetor and to utilize portions of the structure of the air cleaner unit in converting to and from fresh and inside air supply.

Still a further object of my invention is to provide an improved structure of the type wherein the air cleaner is mounted on the body of the vehicle so that the vibrations of the engine will not be imparted to the cleaner.

Other objects of my invention are to provide a structure of this type which increases the power of an engine by supplying to it denser air; to provide an engine carburetor air supply system which is economical to manufacture and install and which may be conveniently converted to supply either inside or outside air to an engine carburetor.

Other objects and advantages will become more apparent from the following description of one embodiment of my invention, reference being had to the accompanying drawings in which—

Fig. 1 is a plan view of the front end of a motor vehicle which is equipped with an engine air supply system embodying the invention, with portions of the vehicle broken away to more clearly show the invention.

Fig. 2 is an enlarged vertical sectional view taken on the line 2—2 of Fig. 1.

Fig. 3 is an enlarged vertical sectional view taken on the line 3—3 of Fig. 1.

Fig. 4 is a horizontal sectional view taken on line 4—4 of Fig. 2, showing the parts of the structure arranged to receive outside air.

Fig. 5 is a horizontal sectional view similar to Fig. 4 but illustrating the parts of the structure positioned to receive air from the engine compartment.

In Fig. 1 I have shown a plan view of the front end portion of a motor vehicle, generally designated by the numeral 10, which has a conventional body and which includes fenders 11 and 12 and a front bumper 13. The vehicle is provided with a conventional engine 14 which is yieldably mounted by structure not shown on the longitudinally extending side rails of the chassis frame or other portions thereof. The engine 14 is disposed in the engine compartment 15 of the vehicle which is provided with suitable sheet metal walls 16. The engine 14 is provided with a fuel mixture device or carburetor 17 which is mounted on and above the intake manifold of the engine and which is provided with an inlet tube 18. The inlet tube 18 is connected to one end of a flexible conduit 19, the other end of which is provided with an elbow 20 having a downwardly extending branch 20'. The downwardly extending branch 20' of the elbow 20 is connected to an air cleaner, generally designated by the numeral 21.

The engine compartment wall structure 16 is provided with brackets 22 and 23 riveted thereto which extend inwardly from the wall structure for supporting the air cleaner 21. Each of the brackets 22 and 23 is provided with horizontal seat portions 24 and 25, respectively, which are spaced from the side rail 15 and are provided with openings 26 and 27, respectively. The openings 26 and 27 receive vertically extending bolts 28 and 29 which are provided with head portions 30 and 31, respectively. The head portions 30 and 31 are welded or in some other similar fashion firmly secured to the underside of the horizontal portions 24 and 25 of the brackets 22 and 23, respectively, and extend upwardly for facilitating the mounting of the air cleaner on the brackets.

The air cleaner is provided with an outer casing 32 which is substantially cylindrical in form and which is provided at its lower end with an inwardly extending horizontal flange 33 which is seated on the upper surface of the horizontal portions 24 and 25 of the brackets 22 and 23, respectively. The flange 33 of the casing 32 is provided with two holes 34 and 35 which receive the bolts 28 and 29, respectively, and which position the casing on the seat portions 24 and 25 of the brackets. The air cleaner 21 is also provided with an inner casing 36 of cup-shaped configuration which has its vertical walls concentric with the casing 32 and which is provided at its lower closed end with a shoulder 37 which is seated against the innermost extremity of the flange 33 of the outer casing 32. The inner casing 36 is provided at its upper end with an outwardly extending substantially horizontal section 38 which rests upon and is supported by the upper end of the outer casing 32. The inner casing 36 is provided with a plurality of window-like openings 39 disposed in its vertical cylindrical wall for the purpose of admitting air to within the inner casing. The inner casing 36 is also provided with oil 36' in its lower end for facilitating the cleaning of the air. A filter element, generally designated by the numeral 40, is concentrically disposed within the inner casing 36 and is provided with a vertical cylindrical wall 41 and end screens 42 and 43 which extend across its upper and lower extremities. The space within the cylindrical wall 41 and between the end screens 42 and 43 is filled with steel wool 43'. The screen 42 is seated at its peripheral edge on a circular flange 44 which is a horizontal extension from the upper end of the cylindrical wall member 41. The air cleaner is also provided with a dome-like cover 45 which has a centrally located opening 46 which receives the lower end of and connects the elbow 20 with the interior of the filter unit. This lower end of the elbow 20 is provided with a groove 47 which receives the edge portions of the cover 45 adjacent the opening 46. The cover 45 is provided at its outer edge with a horizontal rim 46 which cooperates with the section 38 of the inner casing 36, as well as with the outer peripheral edge of the screen 42 and the flange 44 of the filter element 40 for forming an assembly which may be bolted down against the upper edge of the outer casing 32. The rim 46 of the cover 45 is provided with holes 50 and 51, the screen 42 is provided with holes 52 and 53, the flange 44 is provided with holes 54 and 55 and the section 38 is provided with holes 56 and 57 for receiving the upper ends of the bolts 28 and 29, respectively. The registering holes which receive the bolts 28 and 29 are placed at diametrically opposite locations on the filter unit. The bolts 28 and 29 are provided with wing nuts 58 and 59 which engage the upper surface of the rim 46 for securing the entire assembly in place.

The vehicle 10 is provided with conventional grille structure 60, the elements of which are spaced substantially close together but which allow the passage of air therebetween. In accordance with my invention I have provided a duct 61 which is supported on the engine compartment wall structure 16 and which has one end thereof secured to the body of the vehicle adjacent the grille work 60 and which has its other end abutting the outer casing 32 of the air cleaner 21. The last mentioned end of the duct 61 is formed to abut against a cylindrical contour and is provided with a sealing member 62 which forms a seal between the outer surface of this end of the duct and the portion of the outer casing 32 which is engaged by the duct. The outer casing 32 is provided with an opening 63 which is covered with a screen 64 and which extends across the face of the casing approximately the width of the duct 61. Any air entering the duct 61 through the grille work of the vehicle will pass through the screen 64 as well as the windows 39 and hence through the air cleaner. It should be noted at this point that the use of relatively cold air for mixing with the fuel of the vehicle is advantageous in that more power may be delivered by the engine since this cold air is dense.

In Fig. 4 I have shown the opening 63 in the outer casing 32 in the aforementioned registration with the duct 61 and the air entering the air cleaner in the direction indicated by the arrows. It may be seen, however, that in relatively cold climates it may become advisable to obtain the air for engine combustion from within the engine compartment. This may be accomplished by merely removing the nuts 58 and 59, displacing the cover 45 and thereafter lifting the outer and inner casings and all the associated parts therein off of the bolts 28 and 29. Thereafter the entire filter unit including the outer casing 32 may be removed and rotated 180° and replaced on the bolts 28 and 29 so that these bolts extend through the openings 27 and 26, respectively. This arrangement of the structure may be seen in Fig. 5 wherein the opening 63 now directly communicates with the interior of the engine compartment and the air enters the cleaner from the direction indicated by the arrows and the inner end of the duct 61 is completely closed by the vertical wall of the casing 32. The casing 32 may be called a rotary valve in view of the fact that it may be rotated about the vertical axis of the air cleaner to open and close the duct 61.

Although I have shown the duct 61 receiving fresh air through the grille of the vehicle, the fresh air may be received from any convenient location on the vehicle without departing from the scope of my invention. Similarly, the air cleaner may be mounted at some other location on the vehicle as long as the vibrations of the engine are not imparted to it.

By utilizing an air cleaner which is not directly mounted on the engine and subjected to a great deal of vibration, more oil may be disposed within the cleaner to thereby increase its efficiency.

The flexible conduit 19 may be provided with sound deadening means, or if desired, such means may be directly applied to the air cleaner.

My improved mechanisms may be easily adjusted by the operator of the vehicle or, if desired, the outer casing may be rotated by a gas station attendant when the vehicle is given a pre-winter or pre-summer check-up.

While I have illustrated and described but one embodiment of my invention, it is to be understood that such is for the purpose of illustration only, and it is contemplated that those skilled in the art may modify certain details without departing from the spirit or scope of the invention as defined in the claim appended hereto.

I claim:

In a motor vehicle having an engine compartment with a carburetted engine mounted therein and an air supply conduit to said compartment extending through a wall of said compartment and located so that fresh air can be forced into the compartment through said conduit during forward motion of the vehicle; a combined engine air cleaner and rotary valve for control of air flow through said compartment air supply conduit comprising a closed, cylindrical, air cleaner casing adjustably mounted within said compartment for rotation about the casing longitudinal axis, said casing having an engine air supply inlet port formed in a side wall portion thereof and an air supply outlet port formed in an end wall portion thereof and located substantially on the casing longitudinal axis, detachable mounting connections for the cleaner casing located within the compartment and providing means permitting the air cleaner casing to be rotated and selectively anchored in a first position connecting the casing air supply inlet port to said compartment air supply conduit, and to be selectively anchored in a second relatively rotated position wherein the casing air supply inlet port is disconnected from the compartment air supply conduit and is directly connected to the compartment interior, other imperforate side wall portions of said casing closing off passage of air through the compartment air supply conduit when the casing is in said second position, and an engine air supply conduit including a rotatably adjustable joint permanently connecting said casing air outlet port and said engine when the air cleaner casing is in either of its aforementioned air supplying positions.

References Cited in the file of this patent

UNITED STATES PATENTS

| | | |
|---|---|---|
| 1,307,619 | Coatalen | June 24, 1919 |
| 1,499,864 | Gordon | July 1, 1924 |
| 1,513,036 | Donaldson | Oct. 28, 1924 |
| 1,863,015 | Kamrath | June 14, 1932 |
| 1,933,365 | Chandler et al. | Oct. 31, 1933 |
| 2,105,497 | Palmer | Jan. 18, 1938 |
| 2,143,889 | Ledwinka | Jan. 17, 1939 |
| 2,150,295 | Somers | Mar. 14, 1939 |
| 2,175,645 | Replogle | Oct. 10, 1939 |
| 2,203,407 | Donaldson | June 4, 1940 |
| 2,388,213 | Mock | Oct. 30, 1945 |